Nov. 10, 1925.   1,560,723
G. H. PHELPS
PRODUCTION OF BALL RACES AND SIMILAR ARTICLES
Filed Sept. 9, 1920

INVENTOR
George H. Phelps
BY
Anthony Wina
ATTORNEY

Patented Nov. 10, 1925.

1,560,723

UNITED STATES PATENT OFFICE.

GEORGE H. PHELPS, OF WAREHOUSE POINT, CONNECTICUT, ASSIGNOR TO THOMAS E. MURRAY, SR., OF BROOKLYN, NEW YORK.

PRODUCTION OF BALL RACES AND SIMILAR ARTICLES.

Application filed September 9, 1920. Serial No. 409,198.

*To all whom it may concern:*

Be it known that I, GEORGE H. PHELPS, a citizen of the United States, and resident of Warehouse Point, Connecticut, have invented certain new and useful Improvements in the Production of Ball Races and Similar Articles, of which the following is a specification.

My invention aims to provide an improved method of producing ball races or other articles by forming the same in two or more parts and uniting these parts in a very economical way. The accompanying drawings illustrate an embodiment of the invention.

Figure 4:
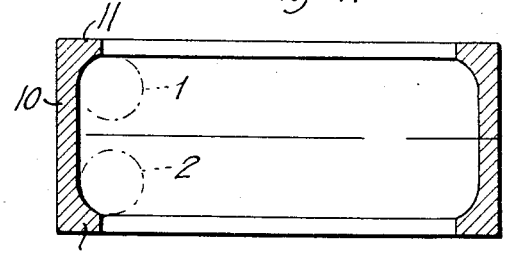

The race indicated is designed to carry two rows of balls, one ball of each row being shown at 1 and 2, Fig. 4. The invention may be applied, however, to single-ball races, to roller bearing races and to a variety of other articles and the articles in question may be divided as shown or in various other ways before welding together.

Referring to the example illustrated, we first form two identical rings 3 and 4 with inward flanges 5 and 6, each forming one-half of the complete article divided transversely to its axis. The two rings 3 and 4 are placed edge to edge with separate filling pieces 7 at intervals between the adjacent edges of the rings and are held in this position between top and bottom electrodes 8 and 9.

A welding current is then passed through the electrodes and at the same time they are pressed together. Preferably, in order to avoid drawing the temper of the parts of the race, the weld is made as quickly as possible. For example, the method of Murray Patent No. 1,281,636 may be used, which consists in subjecting the bodies to be united to a current of extremely high ampere strength and of very brief duration. The invention is useful, however, with various welding methods. The current is concentrated in the comparatively small metal points or filling pieces 7. These pieces, and the portions of the rings in contact therewith, are melted and welded into one. The pressure extrudes all or practically all of the pieces 7 from between the edges of the rings and brings the edges of the latter into close contact with each other; though, if preferred, a space might be left between the edges of the rings except at the points where they are welded to the pieces 7.

Figure 1:
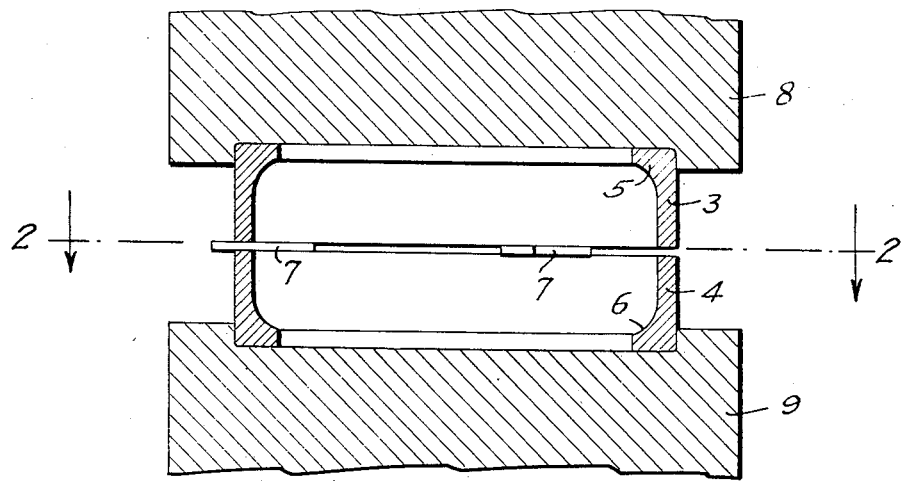
Fig. 1 is a diametral section of two parts of a ball race in position to be welded together.
Figure 2:
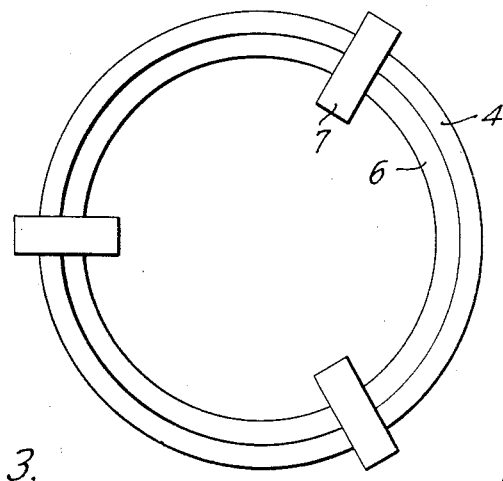
Fig. 2 is a plan of one of the races with certain filling pieces on its edge, as viewed along the line 2—2 of Fig. 1.
Figure 3:
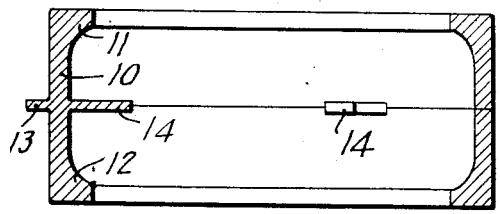
Figs. 3 and 4 are sections similar to Fig. 1 showing respectively the second and final stages of the work.

The product of the welding operation is shown in Fig. 3, consisting of the race 10 with inward flanges 11 and 12 at its edges and with small outer and inner fins 13 and 14 at intervals. These are afterwards ground off or cut or punched off to make the finished product as in Fig. 4.

The inserts 7 may be of various shapes and of various metals and may be provided in any suitable number at separate points around the rings. They furnish points of concentration for the current so as to ensure a quick fusing action with less current than would be required to weld the entire circumference of the rings, and they cost practically nothing. The shapes of the filling pieces or inserts in fact may be such that there will be little or no fin to be subsequently removed.

This invention is particularly useful for ball races and similar articles made of hardened steel because the fusing action takes place over a negligible part of the length of the edges; whereas in the welding of the edges along their entire length there would be a considerable annealing of the steel and loss of the hardness which is necessary for its intended use.

What I claim is:

1. The method of uniting two metal parts edge to edge which consists in placing between their edges at separated points metal inserts extending entirely across said edges and welding them through said inserts.

2. The method of uniting two metal parts which consists in placing between them metal inserts located at separated points and projecting beyond the faces to be united and welding them through said inserts, and removing the projecting portions of said inserts.

3. The method of uniting two metal rings which consists in placing them with their edges toward each other and with metal inserts arranged at intervals between such edges, and welding said rings together through said inserts.

4. The method of forming a ball race which consists in forming two rings constituting component parts of the race, placing said rings with their inner edges toward each other and with metal inserts between such edges making contact with less than the full area thereof and welding said rings together through said inserts.

5. The method of forming a ball race which consists in forming two rings constituting component parts of the race, placing said rings with their inner edges toward each other and with metal inserts between them, said inserts arranged at intervals around said edges and covering the full width thereof and welding said rings together through said inserts, and removing projecting portions of said inserts.

6. An article of manufacture including two parts located edge to edge with intermediate metal between them covering their full width and arranged at intervals in their length, said parts being welded together through said intermediate metal.

7. A race formed of two rings having their edges facing each other with intermediate metal between them and arranged at intervals in the length of said edges, said rings being welded together through said intermediate metal.

8. A race formed of two rings having inward flanges on their outer edges and having their inner edges facing each other with intermediate metal between them over less than the area of said inner edges, the parts being welded together through said intermediate metal, the edges at other points being in contact (but without welding) to determine the width of the race.

In witness whereof, I have hereunto signed my name.

GEORGE H. PHELPS.